United States Patent
Runge et al.

[11] Patent Number: 5,971,859
[45] Date of Patent: *Oct. 26, 1999

[54] VIBRATION CANCELER WHICH IS MOUNTABLE ON SHAFT WITH ENLARGEMENTS

[75] Inventors: Walter Runge, Mörlenbach; Gerald Böhm, Weinheim; Arno Hamaekers, Gorxheimertal-Unterfl.; Andreas Olbrich, Mossautal, all of Germany

[73] Assignee: Firma Carl Freudenberg, Weinheim, Germany

[*] Notice: Under 35 U.S.C. 154(b), the term of this patent shall be extended for 584 days.

[21] Appl. No.: 08/679,023

[22] Filed: Jul. 12, 1996

Related U.S. Application Data

[63] Continuation of application No. 08/326,445, Oct. 20, 1994, abandoned.

[30] Foreign Application Priority Data

Oct. 20, 1993 [DE] Germany .............................. 43 35 766

[51] Int. Cl.[6] ...................................................... F16F 15/12
[52] U.S. Cl. ................................ 464/180; 74/574; 464/83
[58] Field of Search ..................................... 464/180, 181, 464/176, 83, 901; 403/333, 334, 331, 338; 74/574

[56] References Cited

U.S. PATENT DOCUMENTS

| | | | |
|---|---|---|---|
| 2,642,729 | 6/1953 | Strausser | 464/88 |
| 4,452,097 | 6/1984 | Sunkel | 403/338 X |
| 4,516,955 | 5/1985 | Worner et al. | 74/574 X |
| 4,653,169 | 3/1987 | Puszakowski | 74/574 X |
| 4,656,899 | 4/1987 | Contoyonis | 74/574 X |
| 4,692,057 | 9/1987 | Landerbash | 403/334 |
| 4,825,983 | 5/1989 | Nakanishi | 74/574 X |
| 5,069,054 | 12/1991 | Hladky et al. | 464/901 X |
| 5,188,478 | 2/1993 | Bitsch et al. | 403/334 X |
| 5,193,432 | 3/1993 | Smith | 403/338 X |
| 5,328,408 | 7/1994 | Wolf et al. | 464/83 X |
| 5,439,416 | 8/1995 | Jaskowiak | 464/181 |
| 5,445,471 | 8/1995 | Wexler et al. | |

FOREIGN PATENT DOCUMENTS

| | | | |
|---|---|---|---|
| 12-1331 | 5/1991 | Japan | 464/180 |
| 3-121331 | 5/1991 | Japan | 464/180 |

*Primary Examiner*—Eileen Dunn Lillis
*Attorney, Agent, or Firm*—Kenyon & Kenyon

[57] ABSTRACT

A vibration canceler for use on the outer circumference of a shaft rotating about an axis and including two enlargements. The vibration canceler includes half-shells which can be pressed on to the outer circumference of the shaft. The half-shells are joined to at least two inertial masses formed as circle segments by elastic elements which are deformable in a circumferential direction. The inertial masses are joined together by retaining elements. The inertial masses are hingedly joined by link elements and can be restrained in a ring shape by at least one lock element.

14 Claims, 4 Drawing Sheets

VIBRATION CANCELER WHICH IS MOUNTABLE ON SHAFT WITH ENLARGEMENTS

This application is a continuation of application Ser. No. 08/326,445, filed on Oct. 20, 1994 now abandoned.

BACKGROUND OF THE INVENTION

1. Field of the Invention

The invention concerns a vibration canceler for use on the outer circumference of a shaft rotating about an axis and having enlargements on the ends. The vibration canceler at least two half-shells which can be pressed on to the outer circumference of the shaft. The half-shells are joined to at least one inertial mass formed as a circle segment by at least one elastic element made of an elastomeric material, such as rubber, deformable in a circumferential direction. A fastening apparatus joins the inertial masses to one another. The fastening apparatus includes at least one link element which hingedly joins the inertial masses as well as a lock element by which the inertial masses can be restrained in a state in which they are joined together in a ring shape.

2. Description of the Related Art

A vibration canceler of this sort is known. The assembly takes place in a direction transverse to the shaft, which makes it unnecessary to remove the shaft beforehand. However, the disadvantage so this device is that the two inertial masses must be joined together using a very costly joining apparatus. The joining apparatus includes locking pins and screws at the points at which the inertial masses touch one another. Fabrication of this device is very costly. Manifestations of imbalance in this device can be observed very frequently when the shaft is rotating.

SUMMARY OF THE INVENTION

The underlying object of the invention is provide a vibration canceler allowing easier assembly.

In the vibration canceler according to the present invention, the joining apparatus for the inertial masses includes at least one link element which hingedly joins the inertial masses, as well as at least one lock element. The lock element restrains the inertial masses in a state in which they are closed together in a ring shape. The inertial masses are undetachably joined together by the link element in their unassembled state and can be slid on to the shaft to be equipped with the vibration canceler in a direction transverse to the shaft and fastened to the shaft. Storage and assembly of the vibration canceler of the present invention is considerably simplified. In particular, shafts having enlargements of a diameter greater, in the area of their end faces, than the inner diameter of the vibration canceler can be easily attached to the vibration canceler. Enlargements of this type are often used to connect secondary machine elements.

The link elements can be formed by hinges. A hinge in the device of the present invention is a connecting element for the inertial masses that allows the inertial masses to be flexibly connected but does not allow vertical motion relative to one another. Such hinges generally consist of metallic materials. These hinges require no special securing means to bring the vibration canceler into operation.

The link elements can also be formed by at least one film hinge made of a polymeric material. A film hinge in the present invention is a flexible connecting element for the inertial masses which consists of a flexible material and is dimensioned sufficiently thin so that the inertial masses can be hingedly opened relative to one another.

By using a flexible polymeric material to produce the film hinge, the film hinge of the present invention has, with regard to the centrifugal forces arising when the vibration canceler is revolving quickly, a relatively unsatisfactory tensile strength. For this reason, it has proven advantageous if the film hinges in the assembled state of the vibration canceler can be bridged additionally by at least one clamp or similar item which engages undercuts in the half-shells and immovably fastens them to one another. The required centrifugal force safety margin is achieved in this manner. The film hinges consequently simplify the assembly of the half-shells and joining them undetachably during storage. The film hinges can form a one-piece constituent of a coating which covers the inertial masses on the outside. The film hinges can be created in a simple manner during the application of the coating and prevent the penetration of moisture into the plane of separation between the inertial masses. The inertial masses are usually made of a ferrous material as a result of cost constraints. The danger of corrosion can be considerably reduced through the use of film hinges.

It has proven particularly effective to use rubber as the polymeric material for producing the film hinges. Rubber is distinguished by a particularly good adhesiveness to the half-shells, by a good elasticity, a good flexibility and a particularly large resistance to shock. These characteristics are of significant importance for good results during long-term usage of the vibration canceler.

The lock element of the present invention can consist of a clamp which wraps around the outside of shoulders protruding outward in a radial direction from the inertial masses, or is fastened in outwardly opening undercuts in the inertial masses. A lock element of this sort can be produced and assembled in a particularly cost-effective manner.

The clamp and the shoulders can have undercuts which engage one another to guarantee that the clamp is undetachably fastened to the shoulders.

In another refinement, the undercuts extend essentially parallel to the axis of the vibration canceler. The undercuts are axially open at least in one direction. Insertion of the clamp takes place parallel to the axis of the vibration canceler from the direction of the open end. Insertion can take place with the aid of a hammer. The centrifugal forces acting essentially only in a radial direction during normal use cannot loosen such a clamp.

The clamp can be elastically expandable in order to compensate for manufacturing tolerances of the inertial masses and to guarantee their immovable contact with one another during long-term use. The elastic tension must be at least twice as large as the centrifugal forces occurring during normal use.

The clamp can be sunk flush with the surface into the outer circumference of the inertial masses. This reduces manifestations of unbalance, decreases the accident risk and better exploits the available working space.

The lock element can consist of a rivet which joins shoulders protruding outward in a radial or axial direction on the inertial masses. An unintentional or undesired loosening of the joint is impeded, which decreases the accident risk during use of the vibration canceler.

The elastic elements which neighbor one another can be joined by at least one elastic tongue arranged in the region of the link elements. It is therefore possible to press the inertial masses against one another by the elastic tongue.

The vibration canceler has, in its unassembled state, a closed, ring-shaped form. This form considerably simplifies storage and transport. During assembly, the inertial masses are swung open wide enough under elastic expansion of the elastic tongue such that the vibration canceler can be slid on to the shaft in a transverse direction. The forces necessary for this purpose are thereafter removed with the result that the inertial masses return to their original position opposite one another, causing the retaining elements to be pressed on to the shaft. The subsequent installation of the lock element is thus considerably simplified. The elastic tongue and the elastic elements can be formed as a single piece blending into one another and produced together.

An exemplified embodiment of the vibration canceler according to the invention is shown in the drawings. It is explained in more detail hereafter.

DETAILED DESCRIPTION OF THE DRAWINGS

Figure 1:
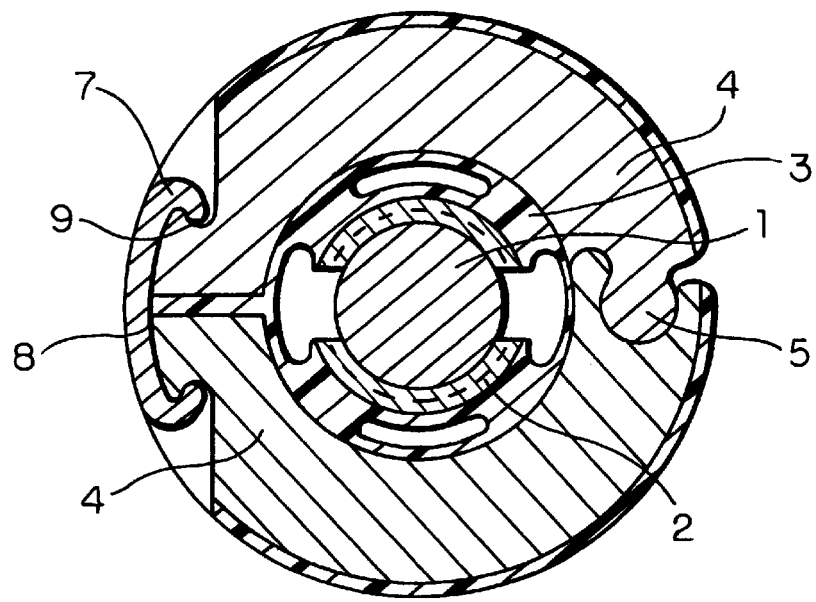
FIG. 1 shows an embodiment of the vibration canceler of the present invention in cross-section.

The vibration canceler of the present invention is shown in FIG. 1. The vibration canceler is used on the outer circumference of a shaft 1 which rotates about an axis. The shaft 1 is equipped with non-removable enlargements 6 (FIG. 2) in the area of the end faces of the shaft 1. The enlargements prevent the vibration canceler from sliding on the shaft 1 in an axial direction. To allow assembly of the vibration canceler on the shaft 1, the vibration canceler includes two half-shells 2 which can be pressed on to the outer circumference of the shaft 1. The half-shells are joined to two inertial masses 4 formed as circle segments. Inertial masses 4 are joined by elastic elements 3 made of an elastomeric material such as rubber and which are deformable in a circumferential direction. The inertial masses 4 are fastened to one another by retaining elements. The retaining elements are formed and dimensioned such that the half-shells 2 are pressed immovably, in a circumferential direction, on to the outer circumference of the shaft 2. The two inertial masses 4 can be hingedly joined relative to one another on one side by a link element 5 and connected on a side opposite the link element 5 by a lock element 7. A film hinge 12 may also hingedly join the inertial masses 4. Such film hinges comprise dimensionally or inherently stable fastening elements serving to connect a joint and a component, which is formed if necessary in one piece with the component. The lock element 7 consists of a clamp which wraps around two shoulders 8 of the inertial masses 4 and lock element 7 is fastened into undercuts 9 in the shoulders 8. The clamp 7 is formed with spring elasticity and has a retention force which is at least twice as large as the centrifugal forces occurring in the vibration canceler during normal use. In this way, the two inertial masses 4 are always arranged in a fixed position with respect to one another even under extreme operating conditions. The link 5 forms a single-piece component of the two inertial masses 4. The link 5 consists of a projection protruding in a circumferential direction from one inertial mass 4, which projection mates with a correspondingly shaped groove in the other inertial mass 4. The projection and the groove have additionally a profile which tapers axially in one direction (See FIG. 2). The projection and groove can thus be inserted into one another in only one axial direction, and falling apart during normal use is prevented by the clamp 7. Clamp 7 is arranged in grooves extending in a circumferential direction and formed in both inertial masses 4. The grooves also contain undercuts 9. The clamp 7 extends in a circumferential direction and is non-removably fastened to both inertial masses 4 and simultaneously prevents axial motion of the two inertial masses 4 relative to one another.

Figure 2:
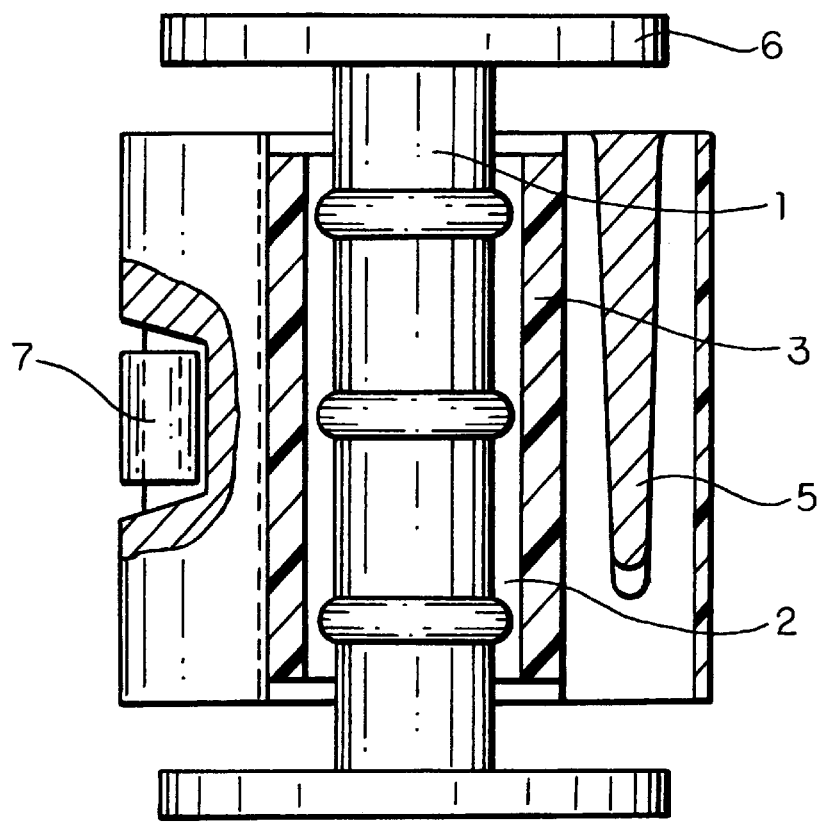
FIG. 2 shows the vibration canceler according to FIG. 1 in partial longitudinal section.
Figure 3:
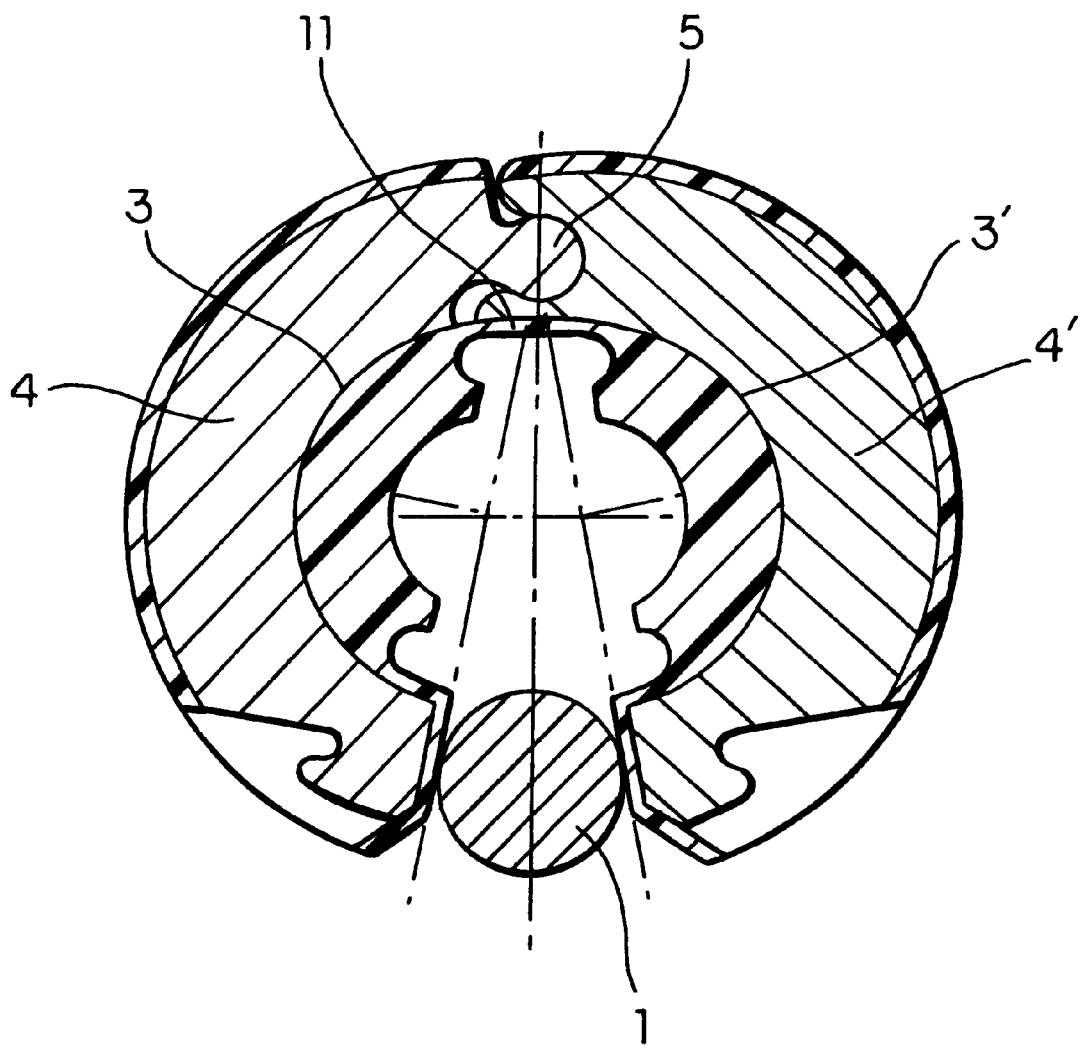
FIG. 3 shows the installation of the vibration canceler according to FIGS. 1 and 2 in which the vibration canceler includes a film hinge.

FIG. 3 shows how the vibration canceler according to FIGS. 1 and 2 is fastened to the shaft 1. The inertial masses 4' hooked into one another are swung open in a circumferential direction for fastening and slid onto the shaft 1 in a direction transverse to the shaft. The two elastic elements 3' are joined by an elastic tongue 11 made of rubber or another elastomeric material and preferably in the form of a film hinge 12, and are arranged in the region of the link element 5. Elastic tongue 11 ensures that the vibration canceler always has a ring-shaped form in the unassembled state. When the two inertial masses 4' are swung open, a temporary elastic expansion of the elastic tongue 11 results. The vibration canceler can be slid on to the shaft in a direction transverse to the shaft in this manner. If the force required to swing open the two inertial masses 4' is subsequently removed, the elastic tongue 11 causes the vibration canceler to return to its original closed ring shape. An abutting contact between the inner circumference of the vibration canceler and the outer circumference of the shaft 1 thus occurs. Subsequently, the lock element 7 is mounted on to the projections 8 in a radial direction, as shown in FIG. 1 and is allowed to snap into place so that it locks into the slots 9. The function of the half-shells 2 in the embodiment of FIGS. 1 and 2 is accomplished directly by the elastic elements 3' in the embodiment of FIG. 3. The elastic elements 3' can also be bonded to the shaft if need be.

Figure 4:
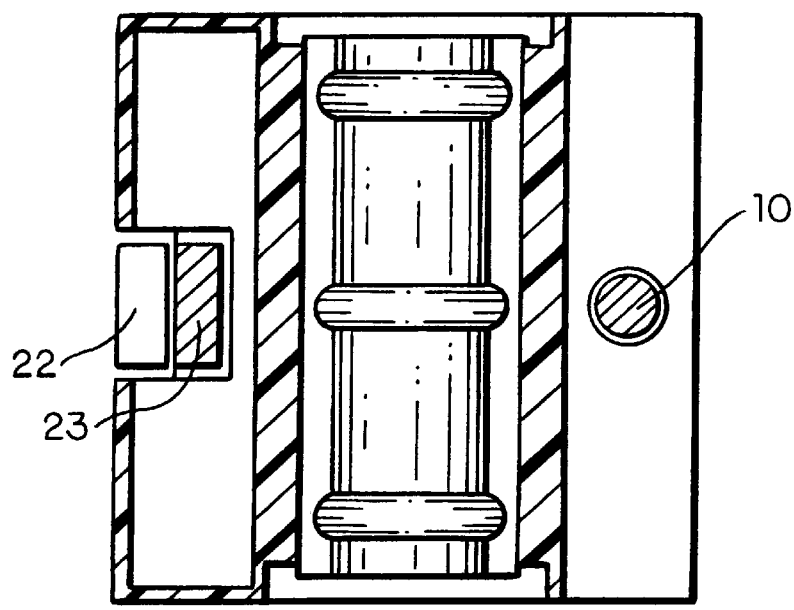
FIG. 4 shows a further embodiment of the vibration canceler according to the invention in longitudinal section.
Figure 5:
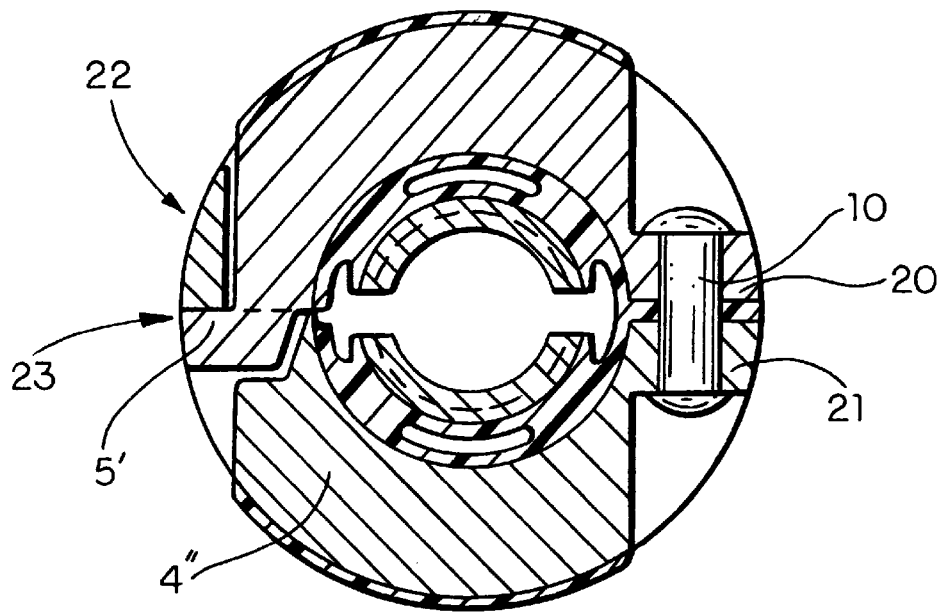
FIG. 5 shows the complete vibration canceler according to FIG. 4 in cross-section.
Figure 6:
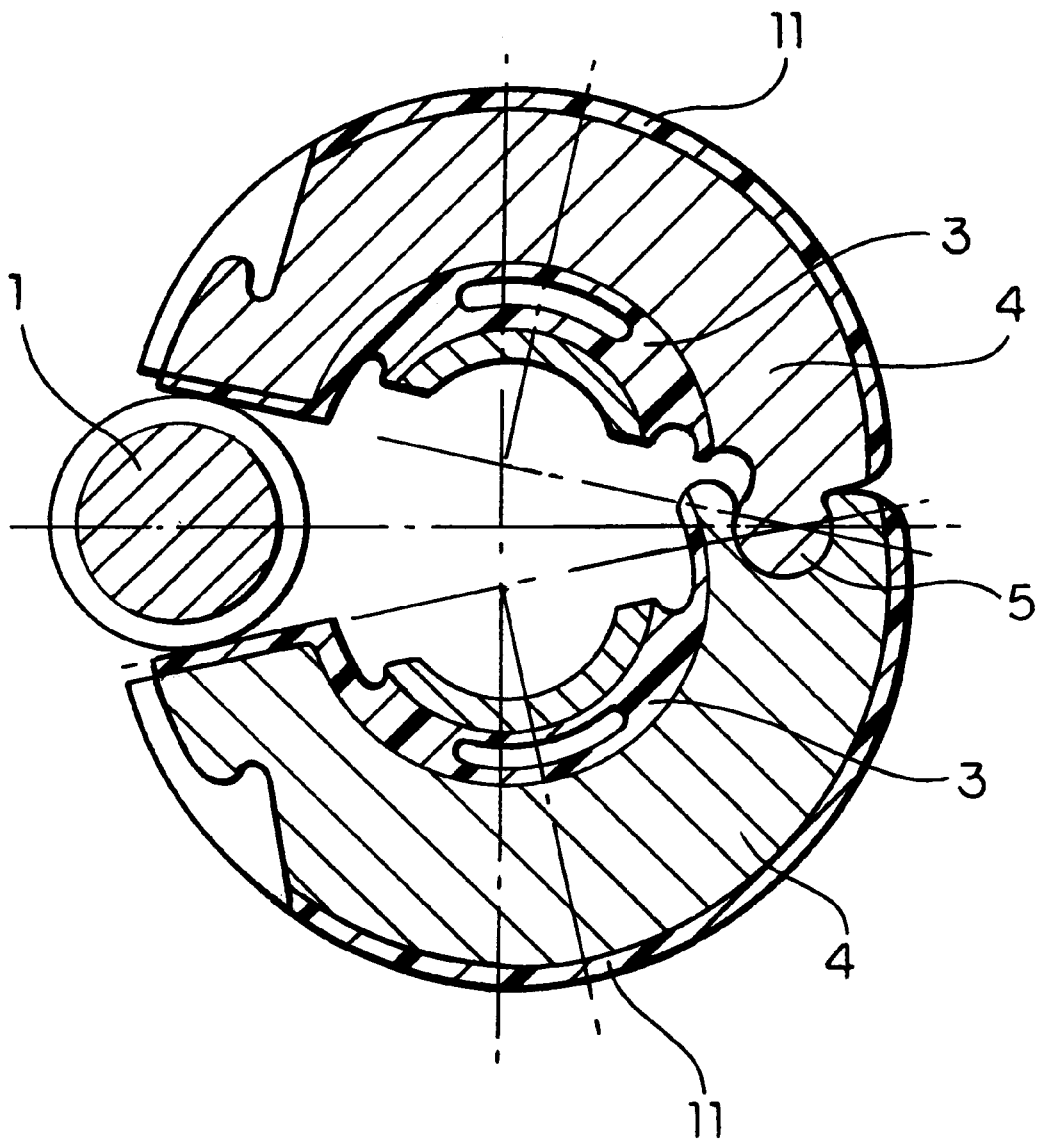
FIG. 6 shows the installation of the vibration canceler according to FIGS. 1 and 2, in which the vibration canceler does not include a film hinge.

FIGS. 4 and 5 show a vibration canceler in which the inertial masses 4" are joined together by a link element 7" which consists of two shoulders 22, 23 which can be hooked into one another. Radially opposite the shoulders 22, 23 are two projections 20, 21 which can be attached to one another and which point outward in a radial direction. Projections 20, 21 are joined together by a rivet 10. A particularly low risk of accidents is achieved in this embodiment.

Instead of the two inertial masses shown in the drawings, a greater number of inertial masses can be used which are joined together, in each case, by a link. A single lock element is also sufficient in this case if an immovable fastening of the elastic elements on the outer circumference of the shaft is to be achieved.

The formation of the elastic elements can take place in accordance with the state of the art. The elastic elements can be effectively made of rubber and joined to the half-shells and inertial masses through direct vulcanization. If a coating of rubber is provided, it is possible to form the coating, the elastic elements, and the film hinge as one piece.

We claim:

1. A vibration canceler on an outer circumference of a shaft rotating about an axis and having enlargements on ends of said shaft, said vibration canceler comprising:

at least two half-shells which can be pressed on to the outer circumference of said shaft, each said half-shell comprising at least one elastic element deformable in a circumferential direction;

at least two inertial masses, each said inertial mass being joined to one of said half-shells;

at least one fastening apparatus joining said inertial masses to one another, said fastening apparatus comprising at least one link element hingedly joining said inertial masses, said fastening apparatus further comprising a lock element, said link element and said lock element allowing said inertial masses to be restrained on said shaft and to be joined together in a ring shape.

2. The vibration canceler of claim 1, wherein:

said link element comprises at least one hinge.

3. The vibration canceler of claim 1, wherein:

said half-shells comprise at least two elastic elements which are joined by at least one elastic tongue adjacent said link element, and wherein said inertial masses can be held together by said elastic tongue.

4. The vibration canceler of claim 3, wherein:

said elastic tongue and said elastic elements are formed as a single piece and blend into one another.

5. The vibration canceler of claim 1, wherein:

said lock element comprises two shoulders which can be hooked into one another.

6. The vibration canceler of claim 1, wherein:

said lock element comprises a rivet which penetrates shoulders protruding outward, in a radial direction, from said inertial masses.

7. A vibration canceler on an outer circumference of a shaft rotating about an axis and having enlargements on ends of said shaft, said vibration canceler comprising:

at least two half-shells which can be pressed on to the outer circumference of said shaft, each said half-shell comprising at least one elastic element deformable in a circumferential direction;

at least two inertial masses, each said inertial mass being joined to one of said half-shells;

at least one fastening apparatus joining said inertial masses to one another, said fastening apparatus comprising at least one link element hingedly joining said inertial masses, said fastening apparatus further comprising a lock element, said link element and said lock element allowing said inertial masses to be restrained on said shaft and to be joined together in a ring shape, said link element comprising at least one film hinge made of an elastomeric material.

8. The vibration canceler of claim 7, further comprising:

an elastomeric coating which covers said at least one inertial mass at least on an outside of said inertial masses.

9. The vibration canceler of claim 7, wherein:

said elastomeric material is rubber.

10. A vibration canceler on an outer circumference of a shaft rotating about an axis and having enlargements on ends of said shaft, said vibration canceler comprising:

at least two half-shells which can be pressed on to the outer circumference of said shaft, each said half-shell comprising at least one elastic element deformable in a circumferential direction;

at least two inertial masses, each said inertial mass being joined to one of said half-shells;

at least one fastening apparatus joining said inertial masses to one another, said fastening apparatus comprising at least one link element hingedly joining said inertial masses, said fastening apparatus further comprising a lock element, said link element and said lock element allowing said inertial masses to be restrained on said shaft and to be joined together in a ring shape, said lock element comprising a clamp which wraps around an outside of shoulders protruding outward, in a radial direction, from said inertial masses.

11. The vibration canceler of claim 10, wherein:

said clamp is sunk flush with a surface on an outer circumference of said inertial masses.

12. The vibration canceler of claim 10, wherein:

said clamp is elastically expandable.

13. The vibration canceler of claim 10, wherein:

said clamp and said shoulders have undercuts which engage said shoulders and said clamp, respectively.

14. The vibration canceler of claim 13, wherein:

said undercuts extend essentially parallel to said axis.

\* \* \* \* \*